(12) United States Patent
Mortensen et al.

(10) Patent No.: US 12,547,646 B1
(45) Date of Patent: Feb. 10, 2026

(54) SYSTEMS AND METHODS FOR VERSION CONTROL OF CASE DATASETS

(71) Applicant: Veeva Systems Inc., Pleasanton, CA (US)

(72) Inventors: Marius K. Mortensen, Burlington (CA); Raagi Pandya, Montreal (CA); Florian Emmanuel Bernard Gilbert Letourneux, Rennes (FR)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/785,123

(22) Filed: Jul. 26, 2024

(51) Int. Cl.
*G06F 7/00* (2006.01)
*G06F 16/21* (2019.01)
*G06F 16/28* (2019.01)

(52) U.S. Cl.
CPC .......... *G06F 16/285* (2019.01); *G06F 16/219* (2019.01)

(58) Field of Classification Search
CPC .............................. G06F 16/285; G06F 16/219
USPC ................................................. 707/600–899
See application file for complete search history.

(56) References Cited

U.S. PATENT DOCUMENTS

2021/0407694 A1\* 12/2021 Deckert ................ G16H 15/00

\* cited by examiner

*Primary Examiner* — Isaac M Woo

(57) ABSTRACT

A method for version control of a case dataset includes receiving adverse event data and determining case data based on the adverse event data. The method further includes generating the case dataset including the case data and first version data. The method further includes receiving and classifying first supplemental adverse event data and classifying. The first supplemental adverse event data is classified as at least one of: a first classification or a second classification. The method further includes receiving second supplemental adverse event data and classifying the second supplemental adverse event data. The second supplemental adverse event data is classified as at least one of: the first classification or the second classification. The method further includes determining supplemental case data based on the second supplemental adverse event data. The method further includes generating second version data. The method further includes generating and outputting a supplemental case dataset.

22 Claims, 6 Drawing Sheets

FIG. 4

Screen 400 shows a user interface with the following elements:

Top navigation: Home | Inbox | Cases | Localized Cases | Transmissions ▼ | PSMF ▼ | Periodic Reporting ▼ | Literature ▼ | Action Items | Analytics ▼ | Signal ▼ | PVAs ▼ | RMPs | Library ▼ | + Create Inbox > I-0000000043
Inbox Item: I-0000000043 (New ▼)

Left sidebar:
- Organization and Region
- Case Validity and Source
- Details
- Case Contacts
- Patient
- Products
- Medical Events
- Documents (2)
- Inbound Transmissions (1)
- Correspondence (0)
- Workflow Timeline
- Sharing Settings 57 of 99 records in this list — 402

▼ Organization and Region
Organization  Biopharma X — 404
Localization  Global

▼ Case Validity and Source
Identifiable Company Product  Yes — 408
Study
Company Product  Drug X — 412
Product Match Confidence  1 - Exact Match — 416
Product Match Criteria  Required Country Matched, Dosage Matched, RoA Matched — 420

Adverse Event  Deafness — 424
Country  United States of America — 428
Identifiable Patient  Yes — 432
Identifiable Reporter  Yes — 436
Source Document  4. Non-Serious - Trigger Watchlist (v0.1) — 440

FIG. 5

US 12,547,646 B1

SYSTEMS AND METHODS FOR VERSION CONTROL OF CASE DATASETS

TECHNICAL FIELD

The present disclosure relates to systems and methods for version control of case datasets.

BACKGROUND

Researchers, scientists, industry players, academics, government regulators, and other stakeholders are increasingly in need of efficient and simple ways to handle promoting supplemental adverse event data into versions of case datasets.

SUMMARY

One embodiment relates to a method for version control of a case dataset. The method includes receiving adverse event data. The method further includes determining case data based at least partially on the adverse event data. The method further includes generating the case dataset including the case data and first version data. The first version data is set to a first version. The method further includes receiving first supplemental adverse event data and classifying the first supplemental adverse event data. The first supplemental adverse event data is classified as at least one of: a first classification or a second classification. The method further includes receiving second supplemental adverse event data and classifying the second supplemental adverse event data. The second supplemental adverse event data is classified as at least one of: the first classification or the second classification. The method further includes determining supplemental case data based at least partially on the second supplemental adverse event data. The method further includes generating second version data based on the first version data. The method further includes generating a supplemental case dataset including the supplemental case data and the second version data and outputting the supplemental case dataset.

Another embodiment relates to a method for version control of a case dataset. The method includes receiving adverse event data. The method further includes determining case data based at least partially on the adverse event data. The case data includes a case identifier. The method further includes generating the case dataset including the case data and first version data. The first version data is set to a first version. The method further includes receiving second adverse event data. The method further includes determining, in response to the second adverse event data including the case identifier, the second adverse event data is first supplemental adverse data. The method further includes receiving third adverse event data. The method further includes determining, in response to the third adverse event data including the case identifier, the third adverse event data is second supplemental adverse data. The method further includes modifying the first supplemental adverse event data to deprecate the first supplemental adverse event data. The method further includes determining supplemental case data based at least partially on the second supplemental adverse event data. The method further includes generating second version data based on the first version data. The method further includes generating a supplemental case dataset including the supplemental case data and the second version data and outputting the supplemental case dataset.

Another embodiment relates to a method for progressing a state of a case dataset. The method includes selecting the case dataset including case data and the state in a first stage from a first repository of the provider computing system. The method further includes selecting a first rule including a first rule criteria and a first sampling ratio from a second repository of the provider computing system. The method further includes determining the first sampling ratio of the first rule is not fulfilled. The method further includes selecting, in response to the first sampling ratio of the first rule not being fulfilled, a second rule including a second rule criteria, a second sampling ratio, and a bypass parameter from the second repository of the provider computing system. The method further includes determining the second sampling ratio of the second rule is fulfilled. The method further includes determining, in response to second sampling ratio being fulfilled, the case data of the case dataset fulfills the second rule criteria. The method further includes modifying, in response to the rule including the bypass parameter, the state of the case dataset from the first stage to a second stage.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 4 may be an illustration of some aspects of a user interface generated by the case dataset version control system of FIG. 1 to manage adverse event data, according to an example embodiment.

FIG. 5 may be an illustration of some aspects of a user interface generated by the case dataset version control system of FIG. 1 to manage a case dataset, according to an example embodiment.

DETAILED DESCRIPTION

Figure 1:
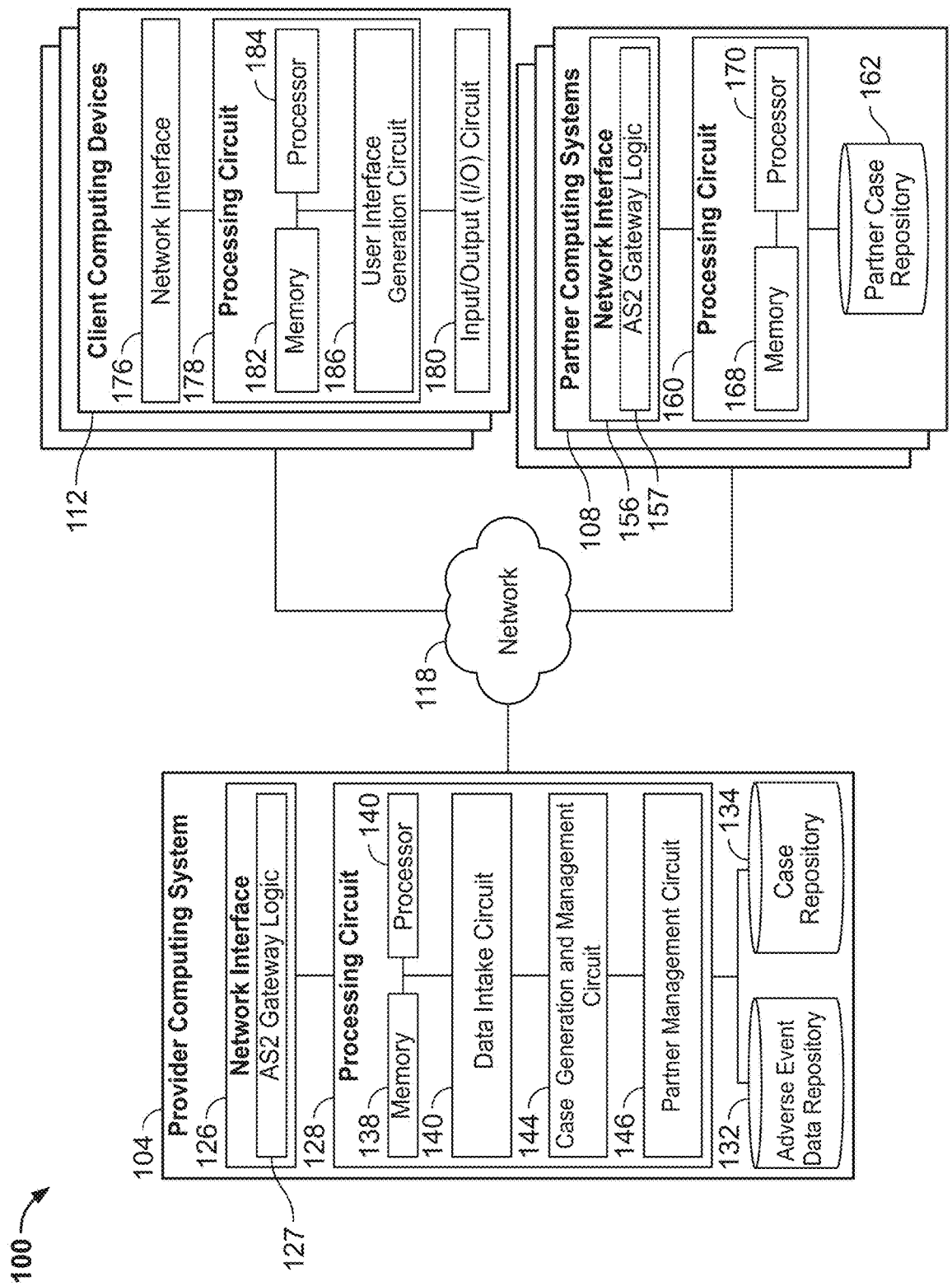
FIG. 1 may be a component diagram of a case dataset version control system, according to an example embodiment.

Referring generally to the figures, systems and methods for version control of case datasets are disclosed. The systems and methods described herein provide for the intake of adverse event data and supplemental (i.e., follow-up) adverse event data, and the promotion of the adverse event data to a case dataset in a select manner, thereby helping and improving the pharmacovigilance industry by only promoting the most up-to-date and pertinent follow-up adverse event data. For instance, because the present systems and methods receive first and second supplemental adverse event data (after the first supplemental adverse event data) and then modify the first supplemental adverse event data to deprecate the first supplemental adverse event data, the present systems and methods provide for improved performance, reduced storage requirements, and a simplified history of the adverse event data (and case dataset), as compared to typical version control systems. For example, typical version control systems may require each piece of supplemental adverse event data to be promoted to a version of the case dataset (e.g., first supplemental adverse event data results in version 1.1, second supplemental adverse event data results in version 1.2, etc.), which requires storage of each individual piece of adverse event data. In comparison, the present systems and methods deprecate old or non-current versions of the adverse event data and promote the most-recent or up-to-date version of the supplemental adverse event data to the case dataset, thereby resulting in less data storage and faster access and manipulation of the current version of the case dataset. Likewise, by deprecating non-current supplemental adverse event data (and not promoting each to a version of the case dataset), the present systems and methods result in a simplified history of the case dataset that has fewer versions to navigate, and less data stored therein.

Additionally, because the present systems and methods utilize partner preferences to determine when to deprecate non-current supplemental adverse event data, the present systems and methods provide for a tailored data intake system that can handle trusted and non-trusted data sources. For instance, via the partner preferences, the provider computing system 104 may indicate whether the data source (e.g., the partner computing system 108) is trusted or non-trusted and the protocols for data intake from the data source, thereby resulting in a tailored solution that can handle both trusted and non-trusted data sources effectively. As a result, the present systems and methods provide a faster and more streamlined data intake system that provides for improved data intake efficiency when working with a trusted data source, and provides improved data quality when working with a non-trusted data source.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products (and associated medical product data) or substances that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact or reporter data, a case identifier (e.g., case worldwide ID (WWID), case number, etc.), case priority data, case seriousness data, case documents, medical product data (e.g., substances in the medical product, medical product registrations, medical product dosages, medical product name, etc.) patient data, and other data associated with a case as defined by the standard ISO/HL7 27953 as well as any past or future standards governing ICSRs of the ISO, the WHO, the FDA, the EMA, or other national health agencies governing ICSRs.

As used herein the terms "data" and "information" are interchangeable such that one may be substituted for the other and vice versa.

Referring now to FIG. 1, a system 100 for intaking and classifying adverse event data and then generating case datasets based on the adverse event data, is shown, according to an example embodiment. The system 100 includes a provider computing system 104, multiple partner computing systems 108, and multiple client computing devices 112 connected by a secure network (e.g., a network 118).

The network 118 communicably and operably couples the provider computing system 104, the partner computing devices 108, and the client computing devices 112 such that communicable and operable computing may be provided between the provider computing system 104, the partner computing devices 108, and the client computing devices 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may be a computer system including one or more servers (e.g., a cloud computing server) each including one or more processing circuits. In some embodiments, the provider computing system 104 may act as a host and provide an application (e.g., a web-based application, a mobile application, etc.) to the client computing devices 112 over the network 118 in response to authenticating the respective computing device. For example, the provider computing system 104 may receive authentication data (e.g., a username and corresponding password, a limited-use key, a two-factor authentication code or key, etc.) from one of the client computing devices 112. The provider computing system 104 may then authenticate the client computing device 112 based on the authentication data and provide an application to the client computing device 112 over the network 118. In some examples, the provider computing system 104 may be a multi-tenant system where various elements of hardware and software may be shared by one or more customers. In a multi-tenant system, a user is typically associated with a particular customer. In one example, a user (e.g., of the client computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, a first repository 132 (also referred to as a source file or adverse event data repository 132), and a second repository 134 (also referred to as a case repository 134). In some embodiments, the provider computing system 104 may include an input/output circuit (e.g., similar to (e.g., the same as) an input/output circuit 180 as will described further herein).

The network interface 126 is structured to establish connections with the partner computing devices 108 and the client computing devices 112 by way of the network 118. The network interface 126 includes program logic (e.g., AS2 Gateway Logic 127) and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The AS2 gateway logic 127 includes programmable instructions that facilitate communication (transmission and receipt) using the Applicability Statement 2 (AS2) communication protocol (as specified in Request for Comment (RFC) 4130) over the network 118 via the network interface circuit 126. For example, using the AS2 gateway logic 127, the network interface 126 may transmit or receive files or data (e.g., the source file, adverse event data, a case, etc.) or other data to the partner computing systems 108 or client computing devices 112 using the AS2 Gateway protocol. In other embodiments, the AS2 gateway logic 127 may transmit or receives files using the most updated Applicability Statement communication protocol (e.g., AS3, etc.).

The processing circuit 128, as shown, comprises a memory 138, a processor 140, a data intake circuit 140, a case generation and management circuit 144, and a partner management circuit 146. The memory 138 includes one or more memory devices (e.g., RAM, NVRAM, ROM, flash memory, hard disk storage, etc.) that store data and/or computer code for facilitating the various processes described herein. That is, in operation and use, the memory 138 stores at least portions of instructions and data for execution by the processor 140 to control the processing circuit 128. The memory 138 may be or include tangible, non-transient volatile memory and/or non-volatile memory.

The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the data intake circuit 140 is structured or configured to receive and process adverse event data and supplemental adverse event data. For instance, the data intake circuit 140 may be configured or structured to periodically receive or retrieve a source file including adverse event data associated with an adverse event from a trusted source (e.g., one of the partner case repositories 162). In some embodiments, the data intake circuit 140 may then match the adverse event data with medical product data of a medical product repository (not shown) and provide the source file to the case generation and management circuit 144 to generate a case dataset. In another example, the data intake circuit 140 may receive a source file and determine the adverse event data is supplemental adverse event data, based on the adverse event data including an identifier (e.g., a case WWUID) that matches a case dataset stored in the case repository 134. In some embodiments, the provider computing system 104 may include multiple data intake circuits 140 (e.g., one for each customer, one for each user, etc.). In some embodiments, the data intake circuit 140 may further search the case repository 134 for case datasets which may be a duplicate of the adverse event data (e.g., potential duplicate cases). Then, in response to determining that the potential duplicate cases are not a duplicate, the data intake circuit 140 may provide the adverse event data to the case generation and management circuit 144 to generate a case dataset.

Likewise, the case generation and management circuit 144 may be structured or configured to receive adverse event data, generate case data, generate case datasets including the case data, store the case datasets in the case repository 134, and/or output the case datasets to partner computing systems 108. For example, the case generation and management circuit 144 may receive a source file including adverse event data and generate case data based on the adverse event data as well as stored within the provider computing system 104 (e.g., medical product data stored in a medical product repository (not shown), study data stored in a study repository (not shown), etc.). Then, the case generation and management circuit 144 may generate a case dataset including the case data and store the case dataset in the case repository 134. In some embodiments, the case generation and management circuit 144 may output (via the network interface circuit 126) one or more of the case datasets as a specific file type (e.g., E2B (R3) XML file, as a Council for International Organizations of Medical Sciences (CIOMS) II PDF file, as a 3500A PDF file, etc.) to one or more of the partner computing systems 108 or the client computing devices 112.

Additionally, the case intake and management circuit 140 may be configured or structured to modify a state of the case dataset, in response to certain criteria being met, from a first stage to a second stage to a third stage, and so on. For instance, the case intake and management circuit 140 may generate a new case and set the state of the case dataset as a beginning stage (e.g., "data entry"). Then, in response to certain criteria being met (e.g., receiving a verification that the case data of the case dataset is correct), the case intake and management circuit 140 may modify the state of the case dataset from the beginning stage to a second stage (e.g., "in-review"). Then, when additional criteria are met (e.g., a quality-control (QC) web form is completed), the case intake and management circuit 140 may modify the state of the case dataset from the second stage to a third stage (e.g., "submission"). This process may be repeated until reaching a final stage (e.g., "Complete"), as will be described further herein.

Still referring to FIG. 1, the partner management circuit 146 may be configured and/or structured to manage partner computing system settings or preferences stored within the provider computing system 104. For example, the provider computing system 104 may receive partner computing system settings associated with a specific partner computing system 108 from one of the client computing devices 112. The partner computing system settings may identify the partner computing system 108 (e.g., a digital address of the partner computing system 108 (e.g., an internet protocol (IP) address, an email address, a file transfer protocol (FTP) address, etc.) and data intake protocols associated with the partner computing system 108 (e.g., deprecate adverse event data which is received before supplemental adverse event data, etc.). The partner management circuit 146 may then store the partner computing system preferences (e.g., in a partner preference repository (not shown)), and provide the preferences to the data intake circuit 140 to be used in intaking adverse event data.

Still referring to FIG. 1, the adverse event data repository 132 may be repository (e.g., a database) that is structured or configured to receive, store, and manage adverse event data received by the provider computing system 104 (e.g., from the client computing devices 112 and/or the partner computing systems 108). In this regard, the adverse event data repository 132 may receive, store, and manage source files and the adverse event data of the source files. In some embodiments, the data intake circuit 140 may generate an adverse event data object (also referred to as an "inbox item" data object) associated with the adverse event data. The adverse event data repository 132 may then intake and store the adverse event data object therein. Further, the adverse event data repository 132 can be structured according to various database types, such as, relational, hierarchical, network, flat, point-in time, and/or object relational. Likewise, the adverse event data repository 132 may include a plurality of nonvolatile/non-transitory storage media such as solid-state storage media, hard disk storage media, virtual storage media, cloud-based storage drives, storage servers, and/or the like.

Similarly, the case repository 134 may be repository (e.g., a database) that is structured or configured to receive, store, and manage case datasets and their respective data (e.g., case data, adverse event data, etc.). For example, the case repository 134 may receive case datasets and related case objects and store the case datasets therein. Then, in response to receiving a query or a request for one or more case datasets (e.g., a query for all cases that include a specific substance), the case repository 134 may provide and/or return the case datasets stored therein that match the query or request. For example, the case repository 134 may receive a query from the case generation and management circuit 144 for all cases that include a specific criteria (e.g., a specific medical product, a specific country of origin, a specific date range). In response, the case repository 134 may determine each case dataset that includes the specific criteria stored therein and return each case dataset. In some embodiments, as will be described further herein, the case repository 134 may receive, store, and manage multiple versions for each case dataset. For instance, in response to receiving supplemental (also referred to as follow-up) adverse event data, the case intake and management circuit 140 may select the corresponding case dataset (e.g., version 1.0), version the case dataset (e.g., to version 1.5), and store the new version of the case dataset in the case repository 134. In this regard, the case repository 134 may store the original version of the case dataset and the versioned or updated version of the case dataset.

Additionally, the case repository 134 can be structured according to various database types, such as, relational, hierarchical, network, flat, point-in time, and/or object relational. In some embodiments, the case repository 134 includes a plurality of nonvolatile/non-transitory storage media such as solid-state storage media, hard disk storage media, virtual storage media, cloud-based storage drives, storage servers, and/or the like.

While not shown, in some embodiments, the provider computing system 104 may include a separate repository for each data type described herein. For instance, the provider computing system 104 may include the adverse event data repository 132, the case repository 134, a reporter repository (not shown), a medical product repository (not shown), an adverse event repository or dictionary, a study repository (not shown), a partner computing system preferences repository (not shown), and the like.

Still referring to FIG. 1, the partner computing systems 108 may be managed by third-party partners (e.g., the FDA, the EHA, Health Canada, partner company 1, partner company 2, partner computing system xyz, etc.) and can be or include a computing device or system configured to communicate with the provider computing system 104 over the network 118. For instance, the partner computing systems 108 can each be a server computer system, a gateway computing system, a laptop computer a desktop computer, and any other network-connected device that can communicate over the network 118. For example, one of the partner computing systems 108 may be the Electronics Submission Gateway (ESG) of the FDA through which one or more E2B XML files may be received from and/or provided to. In another example, one of the partner computing systems 108 may be a laptop computer operated by an employee of a partner company.

In operation, the partner computing systems 108 may communicate with the provider computing system 104 or the client computing device 112 to send and/or receive one or more electronic communications (e.g., case datasets, source files, adverse event data, etc.). For instance, a customer (e.g., pharma company 123) may submit case datasets to the FDA over the ESG of the FDA. Accordingly, the provider computing system 104 may provide case datasets to the first partner computing system associated with the FDA. For instance, the provider computing system 104 may generate an outbound transmission including one or more case datasets. Then, the provider computing system 104 may output the outbound transmission to the first partner computing system 108.

As shown, each partner computing system 108 includes a network interface 156, a processing circuit 160, and a partner case repository 162. In some embodiments, each partner computing system 108 further includes a key repository (not shown) for storing AS2 keys and certificates, which are used to encrypt AS2 transmission (e.g., E2B files).

The network interface 156 is structured to establish connections with the provider computing system 104 and/or the client computing device 112 by way of the network 118. The network interface 156 includes program logic (e.g., AS2 Gateway logic 157) and/or hardware-based components that connect each partner computing system 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The AS2 gateway logic 157 includes programmable instructions that facilitate communication (transmission and receipt) using the Applicability Statement 2 (AS2) communication protocol (as specified in Request for Comment (RFC) 4130) over the network 118 via the network interface circuit 156. For example, using the AS2 gateway logic 157, the network interface 156 may transmit or receive files (e.g., the source file, a case, etc.) or other data to the provider computing system 104 or client computing devices 112 using the AS2 Gateway protocol. In other embodiments, the AS2 gateway logic 157 may transmit or receives files using the most updated Applicability Statement communication protocol (e.g., AS3, etc.).

The processing circuit 160, as shown, comprises a memory 168 and processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The partner case repository 162 may be similar or the same as the case repository 134 and is a repository (e.g., a database, cloud storage, etc.) that is structured or configured to receive, store, and manage case datasets associated with adverse events. For example, one of the partner computing systems 108 may receive a case dataset from the provider computing system 104 and store case dataset in the partner case repository 162. Further, the partner case repository 162 can be structured according to various database types, such as relational, hierarchical, network, flat, point-in time, and/or object relational. In some embodiments, the partner case repository 162 includes a plurality of nonvolatile/non-transitory storage media such as solid-state storage media, hard disk storage media, virtual storage media, cloud-based storage drives, storage servers, and/or the like.

Still referring to FIG. 1, the client computing devices 112 can each be any type of computing device or computing system. For instance, each client computing device 112 can be one or more of a mobile phone, a tablet computer, a laptop computer, a smart watch, a server computer system, or any other internet-connected device. In this regard, each client computing device 112 may be an access-controlled or privileged access device. For instance, a client computing device 112 which provides a specific set of login credentials (e.g., admin credentials) may have additional privileges and thereby access to additional data and features as compared to another client computing device 112 which provides another set of login credentials (e.g., general case processor credentials). In operation, the client computing devices 112 may communicate and interface with the provider computing system 104 via the network 118 to provide and setup one or more rules including rule criteria, web form template(s), and/or rule triggers to be used in processing the rule. As shown, each client computing device 112 may include a network interface 176, a processing circuit 178, and the input/output (I/O) circuit 180.

The network interface 176 is structured to establish connections with the provider computing system 104 by way of the network 118. The network interface 176 includes program logic and/or hardware-based components that connect the client computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 178, as shown, comprises a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 178. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface rendering circuit 186 may be configured to receive a user interface (a web interface in an HTML file and related files, a downloaded graphical user interface, etc.) from the provider computing system 104 and render the user interface on the client computing device 112 via the I/O circuit 180. In this way, the provider computing system 104 may generate one or more user interfaces and provide the one or more user interfaces to the user interface generation circuit 186 to be rendered on the client computing device 112 (e.g., on a display of the I/O circuit 180 of the client computing device 112). For instance, the provider computing system 104 may generate the user interfaces and web pages shown on FIGS. 3-5. Then, in response to receiving the request to access the web pages, the provider computing system 104 may provide the user interface to the client computing device 112 for rendering and display thereon.

The I/O circuit 180 is structured to receive communications from and provide communications to the user of the client computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

Figure 2A:
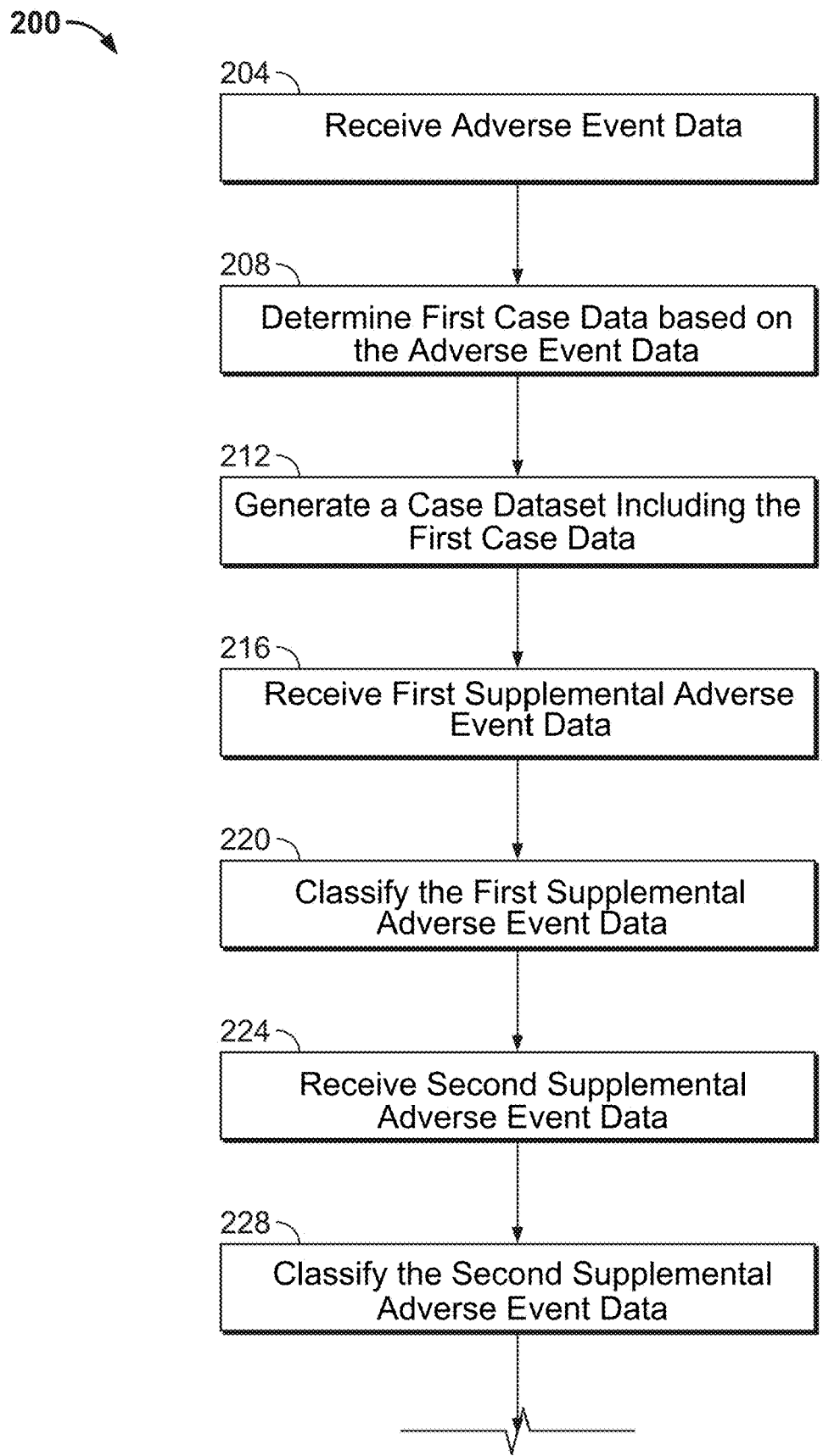
FIGS. 2A-2B may be a flow diagram of a method for intaking supplemental source data and generating a supplemental case dataset based on the supplemental source data, according to an example embodiment.
Figure 2B:
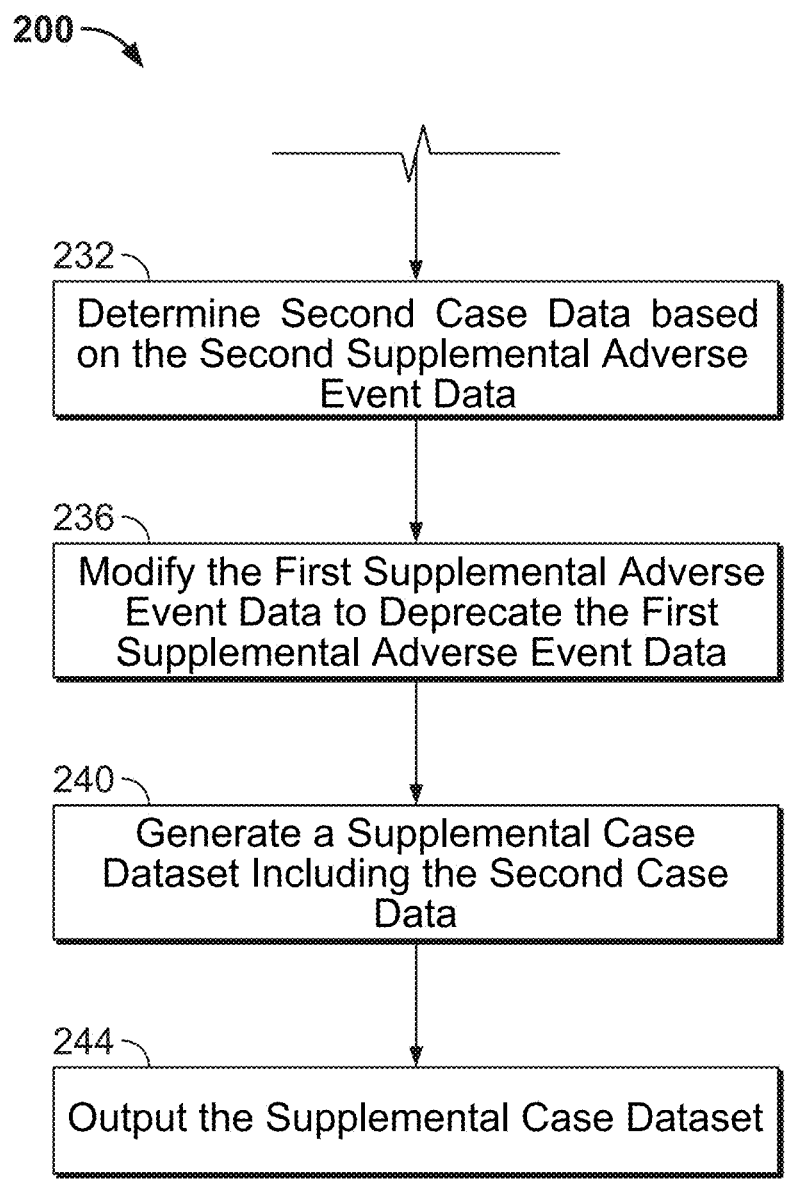

Referring now to FIGS. 2A-2B, a method 200 of case dataset version control is shown, according to an example embodiment. Method 200 can be carried out by the system of FIG. 1. More particularly, the method 200 can be carried out by the processing circuit 128 of the provider computing system 104 and through communication with the client computing devices 112.

Method 200 commences at step 204 at which the provider computing system 104 receives adverse event data. In some embodiments, the adverse event data may be received in a source file. The source file and the adverse event data may be associated with one or more adverse events. For instance, the source file may include adverse event information for each adverse event. Further, the source file may be received from one of the client computing devices 112 or one of the partner computing systems 108. In some embodiments, the source file may be an E2B (R2 or R3) XML file received via an AS2 Gateway communication from the one of the partner computing systems 108 or the client computing devices 112. In other embodiments, the source file may be received from one of the partner computing systems 108 via an application programming interface (API) of the provider computing system 104. In other embodiments, the source file may be at least one of a PDF file, an Excel file, a CSV file, an E2B XML file, an email, or other file types described herein.

The adverse event data may identify or include a case identifier (e.g., a case WWUID), medical product or substance data (e.g., a substance name, a medical product slang name or term, a medical product trade name, a NDC, a medical product identifier, a dosage, a country of origin, a strength, a lot number, a route of administration, etc.), study data (e.g., a study identifier), an adverse event term and code (e.g., a MedDRA term and code), reporter data (e.g., a reporter name, a reporter country, a reporter address or contact information (e.g., email, phone number, IP address, FTP address, etc.)), patient data (e.g., patient initials, patient address or contact information), a report type (e.g., spontaneous, from study, from marketed medical product, etc.), a seriousness of the adverse event, and the like.

In some embodiments, after receiving the adverse event data, the provider computing system 104 may generate an adverse event data object (also referred to as an inbox item data object) and store the adverse event data of the source file in the source file data object. In some embodiments, the provider computing system 104 may store the adverse event data and/or the adverse event data object in the adverse event data repository 132.

Once the provider computing system 104 has received the adverse event data, the method 200 proceeds to step 208 at which the provider computing system 104 determines or generates case data based on the adverse event data. In some embodiments, the provider computing system 104 may determine the case data based at least partially on the adverse event data. For instance, the provider computing system 104 may transform or add each piece of adverse event data to a specific field or portion of the case data. In one example, an adverse event term of the adverse event data may be added to an adverse event field of the case data. In this regard, the case data may include at least a portion of the adverse event data. In another example, the provider computing system 104 may determine at least a portion of the case data by transforming adverse event data that is in an incorrect format into a correct format (e.g., "SE" to "Sweden"). In some embodiments, at step 208, the provider computing system 104 may further generate a priority of the case based on the adverse event data, a rank of the adverse events associated with the current case, a rank of the medical products, and the like.

Additionally, to determine case data at step 208, the provider computing system 104 may retrieve the medical product and/or study data of the medical product and/or study identified in the adverse event data from a medical product repository (not shown) or study repository (not shown), and determine case data by matching the adverse event data with the medical product and/or study data. For example, the received adverse event data may indicate that the patient consumed Y Milliliters of a medical product X on Mar. 23, 2000. The provider computing system 104 may then search the medical product repository (not shown) for medical product data pertaining to medical product X and return additional values and medical product data (e.g., dosage of medical product X, the chemical formula of medical product X, expected side effects of medical product X, a clinical study that medical product X is currently being studied in, a clinical study #, pertaining to medical product X, and the like) as previously provided by the user. This additional medical product data and study data may then be included in the case data. In another example, the adverse event information may indicate that the patient consumed medical products A, B, and C on Mar. 23, 2000. The provider computing system 104 may determine that the user has not provided any medical product data pertaining to medical products A and B but has provided medical product data pertaining to medical product C. Accordingly, the provider computing system 104 may retrieve the medical product data pertaining to medical product C as well as assign a ranking of one to the medical product C, while assigning a ranking of two or three to the medical products A and B. The ranking may then be used to list or sort the medical product data within the case dataset (i.e., a ranking of one appears higher than a ranking of two, and so on) and on any user interfaces.

Once the provider computing system 104 has determined the case data based on the adverse event data, the method 200 proceeds to step 212 at which the provider computing system 104 generates a case dataset including the case data. In some embodiments, at step 212, the provider computing system 104 may generate a case data object (also referred to as a data record) associated with or including the case identifier of the case. The case data and/or the case data object may include version data (e.g., version 1.0, version 1.1, an initial version, etc.) of the case dataset. Further, the case dataset may include a case data object which may be used as a vehicle or apparatus for the case dataset and for storing the case data within the case repository 134 of the provider computing system 104. For instance, the provider computing system 104 may determine or generate the case data, determine and/or generate version data, and then populate the case data object with the case data.

In some embodiments, before steps 208 or 212, the provider computing system 104 may search the case repository 134 for potential duplicate case datasets of the case dataset to be generated. For instance, the provider computing system 104 may search the case repository 134 for cases that include a similar or the same case identifier, medical product(s), adverse event(s), report date, reporter name, and the like. In response to returning one or more potential duplicate case datasets, the provider computing system 104 may provide the potential duplicate case datasets and the adverse event data (or the newly generated case data) for review and comparison. Then, in response to receiving an indication the case datasets are not duplicates, the provider computing system 104 may proceed to step 208 or 212.

Once the provider computing system has generated the case dataset, the method 200 proceeds to step 216 at which the provider computing system 104 receives first supplemental adverse event data (also referred to as a follow-up adverse event data). The first supplemental adverse event data may be received in a source file. For instance, at step 216, the provider computing system 104 may receive a second source file and determine the second source file includes first supplemental adverse event data. For example, the case dataset may include an identifier (e.g., a case WWUID). Likewise, the first supplemental adverse event data may include the same identifier and data which was not included in the first source file (e.g., a new adverse event term, new medical product data, a new seriousness, new reporter data, etc.). For instance, the first source file may include the adverse event term of "Headache" and a seriousness of "non-serious". Then, based on new events occurring with the patient, the second source file may include the adverse event term of "brain aneurysm" and the seriousness of "serious-resulted in hospitalization". Accordingly, based on the first supplemental adverse event data including the same identifier and new or modified data, the provider computing system 104 may determine the second adverse event data is supplemental adverse event data.

In some embodiments, at or after the step 216, the provider computing system 104 may generate and/or add a lifecycle state or status to the first adverse event data. For instance, after receiving the first supplemental adverse event data, the provider computing system 104 may generate an adverse event data object and store the first supplemental adverse event data in the adverse event data object. In some embodiments, the adverse event data object may include the lifecycle state or status (to indicate the status of the first supplemental adverse event data), and the provider computing system 104 may set the lifecycle state as "Supplemental" or "Follow-Up," indicating the first supplemental adverse event data is a supplemental set of data. Then, after generating the adverse event data object, the provider computing system 104 may store the first supplemental adverse event data and/or the adverse event data object in the adverse event data repository 132.

Once the provider computing system 104 has received the first supplemental adverse event data, the method 200 may proceed to step 220 at which the provider computing system 104 classifies the first supplemental adverse event data. As described herein, the provider computing system 104 may classify the supplemental adverse event data based on new or changed portions of the data. In some embodiments, the provider computing system 104 may classify the adverse event data into a first class or category (non-significant), a second class or category (significant), or a third class or category (urgent-significant) based on the new or changed portions of the adverse event data. For instance, the provider computing system 104 may classify the first supplemental s adverse event data into the third class or category in response to at least one of: the first supplemental adverse event data including a cause of death, the first supplemental adverse event data including a date of death, the first supplemental adverse event data including a seriousness of "serious—results in death or "serious—life threatening," and the first supplemental adverse event data including an adverse event term of "death." Further, the provider computing system 104 may classify the first supplemental adverse event data into the second class or category in response to at least one of: the associated or parent case dataset (e.g., the case dataset generated at step 212 and including the same identifier therein) including a case tag or indicator of Serious Unexpected Suspected Adverse Event (SUSAR) and multiple pieces of the first supplemental adverse event data being new or mismatched when compared to the case data of the case dataset (e.g., the first supplemental adverse event data including a new or different (i.e., mismatched) age field from the case data, the first supplemental adverse event data including a new or different (i.e., mismatched) gender field from the case data, the first supplemental adverse event data including a new or different (i.e., mismatched) narrative field from the case data, the first supplemental adverse event data including new or different (i.e., mismatched) adverse event terms from the case data, the first supplemental adverse event data including new or different (i.e., mismatched) medical product data from the case data, the first supplemental adverse event data including new or different (i.e., mismatched) reporter data from the case data, etc.). In comparison, the provider computing system 104 may classify the first supplemental source file into the first class or category in response to a single piece of the first supplemental adverse event data being new or mismatched when compared to the case data of the case dataset.

In some embodiments, the provider computing system 104 may classify the supplemental adverse event data into the second class or category or the first class or category based on the pieces of first supplemental adverse event data which are new or do not match the case data of the case dataset. For instance, the provider computing system 104 may categorize the first supplemental adverse event data into the second category based on the medical product data (of the first supplemental adverse event data) being new or not matching the medical product data of the case data. In another example, the provider computing system 104 may categorize the first supplemental adverse event data the second category based on the adverse event term(s) (of the first supplemental adverse event data) being new or not matching the adverse event term(s) of the case data. In another example, the provider computing system 104 may categorize the supplemental source file into the second category based on the gender or age field of the supplemental adverse event data being new or not matching the corresponding age or gender fields of the case data. In comparison, the provider computing system 104 may categorize the first supplemental adverse event data into the first category based on the reporter data of the first supplemental adverse event data not matching the reporter data of the case data.

In some embodiments, the provider computing system 104 may utilize the class of the supplemental adverse event data to arrange and order the adverse event data objects on a user interface, as will be described further herein. For instance, adverse event data classified into the third class may be displayed and arranged above adverse event data classified into the second class, which may be displayed and arranged above adverse event data files classified into the first class.

By arranging the adverse event data based on the class/classification and/or the lifecycle state of the adverse event data, the systems and methods described herein provide for an improved user interface. In conventional systems, a user typically has to parse each received piece of adverse event data for pertinent or major changes as well manually arrange the adverse events. In comparison and as will be further described herein, the present systems and methods may arrange the adverse events based on the determined class and the lifecycle state for each piece of adverse event data. In one example, multiple pieces of follow-up adverse event data may be arranged on the user interface based on the severity of the medical event (e.g., as indicated by the classification) such that the most severe or important changes to the case dataset (e.g., urgent-significant follow-up) are listed proximate the top of the user interface and the least sever or important changes to the case dataset are listed proximate the bottom of the user interface (e.g., non-significant follow-up). By doing so, the systems and methods described herein arrange the adverse events based on the pertinence and importance of the changes to the case data and provide an improved user interface for displaying follow-up adverse events. This arrangement provides the user with the important follow-up adverse events proximate the top of the user interface (i.e., where the user typically first looks), providing for a quick assessment the follow-up adverse events.

Once the provider computing system 104 has classified the first supplemental adverse event data, the method 200 proceeds to step 224 at which the provider computing system 104 receives second supplemental adverse event data. The second supplemental adverse event data may be received in a source file. In some embodiments, at step 224, the provider computing system 104 may receive a third source file and determine the third source file includes second supplemental adverse event data. For example, the case dataset may include an identifier (e.g., a case WWUID). Likewise, the third supplemental adverse event data may include the same identifier and data which was not included in the case data (e.g., a new adverse term, new medical product data, a new seriousness, new reporter data, etc.). For instance, the first case dataset may include the medical product of "Drug X," but no dosage. Then, the third source file may include the medical product of "Drug X" and a dosage of "40 mg." Accordingly, based on the third source file including the same identifier and new or modified adverse event data, the provider computing system 104 may determine the adverse event data is second supplemental adverse event data.

In some embodiments, at or after the step 224, the provider computing system 104 may generate and/or add a lifecycle state or status to the second supplemental adverse event data. For instance, after receiving the second supplemental adverse event data, the provider computing system 104 may generate an adverse event data object and store the second supplemental adverse event data in the adverse event data object. In some embodiments, the adverse event data object may include the lifecycle state or status (to indicate the status of the adverse event data) of the second supplemental adverse event data, and the provider computing system 104 may set the lifecycle state as "Supplemental" or "Follow-Up," indicating the second supplemental adverse event data is supplemental. Then, after generating the adverse event data object, the provider computing system 104 may store the second supplemental adverse event data and/or the adverse event data object in the adverse event data repository 132.

Once the provider computing system 104 has received the second supplemental adverse event data, the method 200 may proceed to step 228 at which the provider computing system 104 classifies the second supplemental adverse event data. As described herein, the provider computing system 104 may classify the second supplemental adverse event data based on new or changed adverse event data (as compared to the case data of the case dataset). In some embodiments, the provider computing system 104 may classify the second supplemental source file into a first class or category (non-significant), a second class or category (significant), or a third class or category (urgent-significant) based on the second supplemental adverse event data.

Once the provider computing system 104 has classified the second supplemental adverse event data, the method 200 proceeds to step 232 at which the provider computing system 104 modifies the first supplemental adverse event data to deprecate or outmode the first supplemental adverse event data. For instance, the provider computing system 104 may modify the state or status of the first supplemental adverse event data from a first status (e.g., "follow-up") to a second status (e.g., "follow-up (Not Current)" or "Not Current"). In some embodiments, the provider computing system 104 may modify the first supplemental adverse event data to deprecate or outmode the first supplemental adverse event data based on the partner preferences described herein. For instance, the partner preferences may indicate the provider computing system 104 is to outmode old or first-received supplemental adverse event data, in response to receiving new supplemental adverse event data. In this regard, the first or original adverse event data, the first supplemental adverse event data, and the second supplemental adverse event data may each be received from a first partner computing system 108 (e.g., via a trusted email address). Accordingly, because the first partner computing system 108 is trusted to keep up-to-date data, each piece of supplemental adverse event data is expected to include the new data and modifications of the previous supplemental adverse event data, and the user of the client computing device 112 only needs to review and promote the most-recent supplemental adverse event data. Therefore, the partner preferences may indicate the provider computing system 104 is to modify the previous supplemental adverse event data, in response to receiving a new supplemental adverse event data for the same case dataset.

By deprecating old or non-current supplemental adverse event data, the present systems and methods provide a technical improvement to case dataset version control. For instance, because the present systems and methods receive first and second supplemental adverse event data (after the first supplemental adverse event data) and then modify the first supplemental adverse event data to deprecate the first supplemental adverse event data, the present systems and methods provide for improved performance, reduced storage requirements, and a simplified history of the adverse event data (and case dataset), as compared to typical version control systems. For example, typical version control systems may require each piece of supplemental adverse event data to be promoted to a version of the case dataset (e.g., first supplemental adverse event data results in version 1.1, second supplemental adverse event data results in version 1.2, etc.), which requires storage of each individual piece of adverse event data. In comparison, the present systems and methods deprecate old or non-current versions of the adverse event data and promote the most-recent or up-to-date version of the supplemental adverse event data to the case dataset, thereby resulting in less data storage and faster access and manipulation of the current version of the case dataset. Likewise, by deprecating non-current supplemental adverse event data (and not promoting each to a version of the case dataset), the present systems and methods result in a simplified history of the case dataset that has fewer versions to navigate, and less data stored therein.

Additionally, because the present systems and methods utilize partner preferences to determine when to deprecate non-current supplemental adverse event data, the present systems and methods provide for a tailored data intake system that can handle trusted and non-trusted data sources. For instance, via the partner preferences, the provider computing system 104 may indicate whether the data source (e.g., the partner computing system 108) is trusted or non-trusted and the protocols for data intake from the data source, thereby resulting in a tailored solution that can handle both trusted and non-trusted data sources effectively. As a result, the present systems and methods provide a faster and more streamlined data intake system that provides for improved data intake efficiency when working with a trusted data source, and provides improved data quality when working with a non-trusted data source.

Once the provider computing system 104 has modified the first supplemental adverse event data to deprecate the first supplemental adverse event data, the method 200 proceeds to step 236 at which the provider computing system 104 determines second case data based on the second supplemental adverse event data (and/or the original case data). In some embodiments, the provider computing system 104 may determine the second case data based at least partially on the second supplemental adverse event data and the original case data. For instance, the provider computing system 104 may transform or add each piece of the second supplemental adverse event data to a specific field or portion of the second case data, and then use the pieces of original (first) case data when the supplemental adverse event data is unfilled. In one example, an adverse event term of the second supplemental adverse event data may be added to an adverse event field of the second case data.

Once the provider computing system 104 has determined the second case data, the method 200 proceeds to step 240 at which the provider computing system 104 generates a supplemental case dataset including the second case data. In some embodiments, at step 240, the provider computing system 104 may generate a case data object (also referred to as a data record) associated with or including the case identifier of the case. In this regard, the supplemental case dataset may include a case data object which may be used as a vehicle or apparatus for the supplemental case dataset and storing the second case data within the case repository 134 of the provider computing system 104. For instance, the provider computing system 104 may determine or generate the second case data and then populate the case data object with the case data. In some embodiments, the provider computing system 104 may version the original case dataset (e.g., the case data object of the original case dataset) and then store the supplemental case dataset in the new version of the case dataset. For instance, the provider computing system 104 may version the original case dataset from a first version (e.g., version 1.0, an initial version) to a second version (2.0) and store the supplemental case dataset in the second version of the case dataset.

Once the provider computing system 104 has generated the supplemental case dataset, the method 200 proceeds to step 244 at which the provider computing system 104 outputs the supplemental case dataset. For instance, the provider computing system 104 may output the supplemental case dataset including at least a portion of the second case data to one of the partner computing systems 108. For instance, the provider computing system 104 may output the case dataset as an E2B (R2 or R3) XML file to one or more of the partner computing systems 108 via an AS2 Gateway communication. In some embodiments, the provider computing system 104 may output the supplemental case dataset within a specific timeframe or period of time. For instance, the provider computing system 104 may output the supplemental case dataset within a specific number of days or weeks (e.g., 15 days, 14 days, 2 weeks, 1 week, 1 month, 30 days) from the receipt of the most recent or up-to-date supplemental adverse event data.

In some embodiments, the provider computing system 104 may output the supplemental case dataset within a specific timeframe from the receipt of supplemental adverse event data which is classified into the second or third category. For instance, the provider computing system 104 may determine a supplemental case dataset receipt date (also referred to as a new info date) based on the receipt date of the first supplemental case data or the second supplemental case data. Then, the provider computing system 104 may determine a final submission or output date by adding the period of time to the supplemental case dataset receipt date. In one example, in response to receiving first supplemental adverse event data, and then classifying the first supplemental adverse event data into the first category, the supplemental case dataset receipt data may not be set and the time period or timeframe for submitting the case dataset may not start. In comparison, in response to receiving second supplemental adverse event data, and then classifying the second supplemental adverse event data into the second or third category, the supplemental case dataset receipt data may be set as the receipt date of the second supplemental adverse event data and the time period or timeframe for submitting the case dataset may start (e.g., 15 days added to the date of receipt of the second supplemental adverse event data).

It should be understood that while the method 200 is discussed with regard to "first" supplemental adverse event data and a "second" supplemental adverse event data, that additional supplemental adverse event data is possible and within the scope of the method 200. For instance, the provider computing system 104 may receive five pieces of supplemental adverse event data (all for the same original case dataset). Accordingly, the provider computing system 104 may classify each and modify the four oldest (e.g., first received) pieces of supplemental adverse event data to deprecate each, while utilizing (e.g., determining second case data (step 236), generating the supplemental case dataset (step 240), and outputting the supplemental case dataset (step 244)) the newest (e.g., last received) or up-to-date piece of supplemental limited because the provider computing system 104 simply utilizes the last received supplemental adverse event data and deprecates the other supplemental adverse event data.

Figure 3:
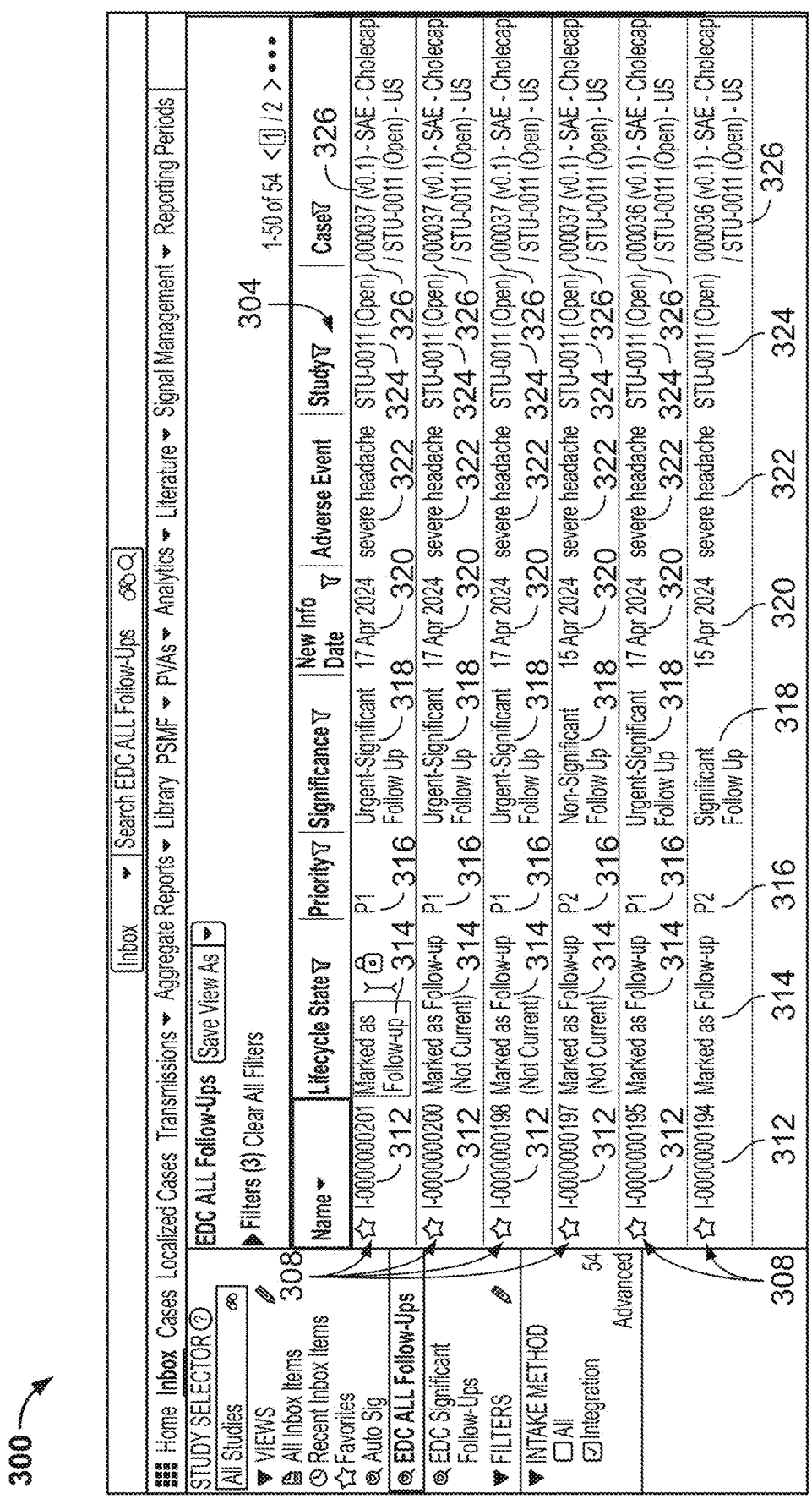
FIG. 3 may be an illustration of some aspects of a user interface generated by the case dataset version control system of FIG. 1 to display and arrange supplemental adverse event data, according to an example embodiment.
Figure 5:
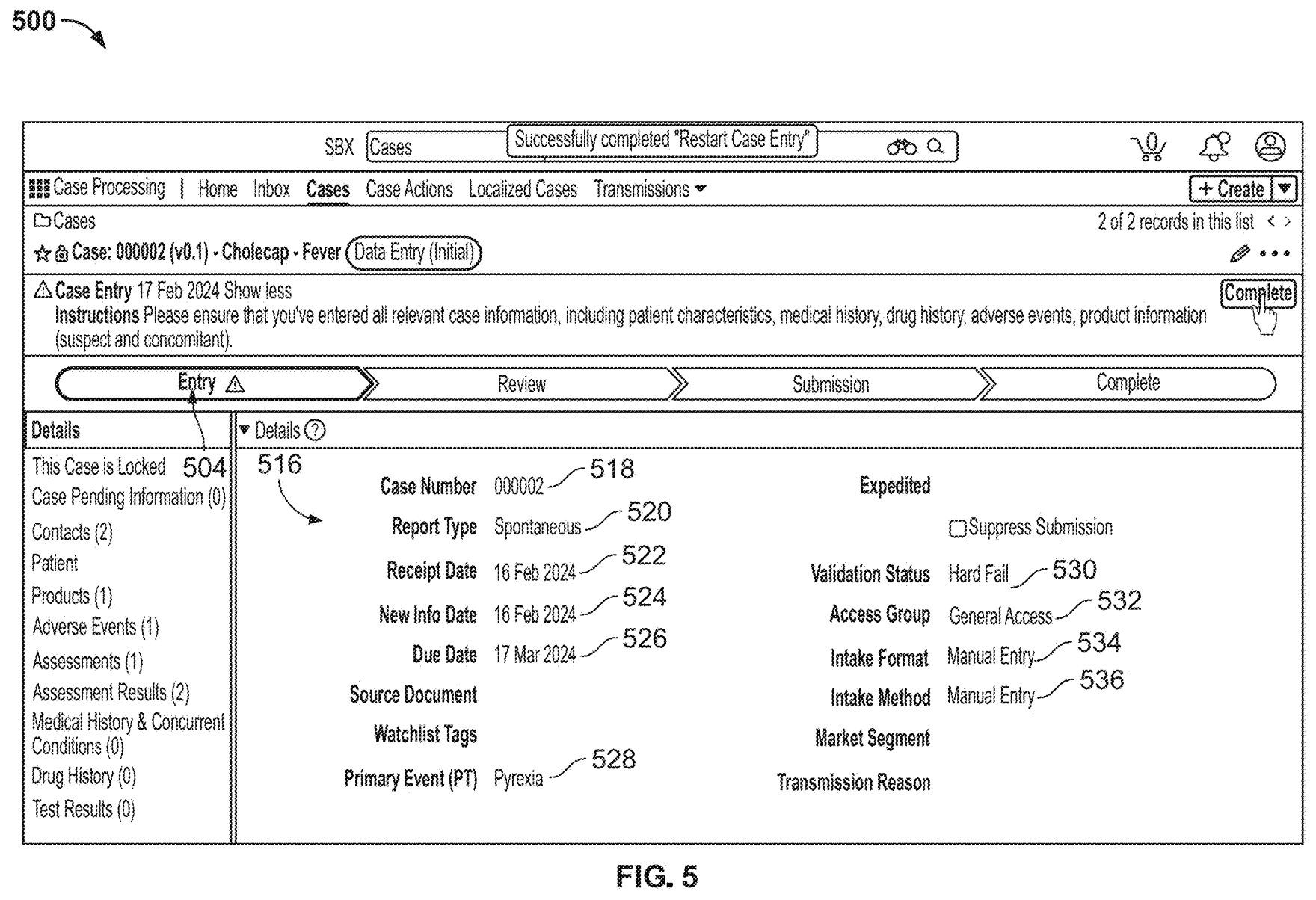

Referring now to FIGS. 3-5, user interfaces shown and displayed to the user of the one or more client computing devices 112 during the method 200 are shown, according to example embodiments. As described herein, the user interfaces of FIGS. 3-5 may be one or more of web interfaces generated by the provider computing system 104 and rendered by each of the client computing devices 112 as part of a web application or graphical user interfaces downloaded and generated by each of the client computing devices 112 as part of a software application (e.g., a mobile application, etc.). Further, the user interfaces shown on FIGS. 3-5 allow for communication between the user) and the provider computing system 104 via the respective client computing device 112 (specifically via the I/O circuit 180). Through interaction with the various user interfaces, the user may provide user input, feedback, and other data requested by the provider computing system 104. In this regard, it should be understood that each interaction described herein by the user with the user interfaces of FIGS. 3-5 may be provided to one or more of the client computing devices 112 and then transmitted to the provider computing system 104 and that each action described herein as occurring to the respective client computing device 112 (e.g., navigating to a certain page, generating a popup, etc.) may be performed by the provider computing system 104.

Referring now to FIG. 3, a supplemental adverse event page 300 (also referred to as a follow-up page 300) which can be displayed on a display the I/O circuit 180 of the client computing devices 112, is shown. In general, the supplemental adverse event page 300 provides the user an interface to manage and review supplemental adverse event data. As shown, the supplemental adverse event page 300 includes an adverse event data object listing 304. To render or generate the supplemental adverse event page 300 on the client computing device 112, the provider computing system 104 may provide supplemental adverse event data, of the adverse event data repository 132, and associated data to the client computing device 112. In this regard, it should be understood that each of the sections, fields, or buttons of the supplemental adverse event page 300 may be or included in the adverse event data described herein.

The adverse event data object listing 304 provides the user of the respective client computing device 112 with an interface to manage and review the supplemental adverse event data of the supplemental adverse event data page 300. As shown, the adverse event data object listing 304 includes multiple supplemental adverse event data object representations 308. The adverse event data object representations 308 may each represent a specific piece of adverse event data and include the adverse event data associated with each. For instance, each adverse event data object representations 308 is shown to include a name field 312, a lifecycle state or status field 314, a priority field 316, a significance classification field 318, a new info date field 320, an adverse event field 322, an associated study field 324, and an associated case field 326.

The name field 312 may be a selectable field through which the user of the respective client computing device 112 can review, edit, and/or initially set the name of the supplemental adverse event data associated with the supplemental adverse event data object representation 308 which may then be sent by the respective client computing device 112 to the provider computing system 104 for storage (e.g., in the rule repository 132). Further, the name field 312 may be a selectable button or link that, when selected, causes the client computing device 112 to navigate to adverse event data page 400 (also referred to as an inbox item page 400).

Similarly, the lifecycle state field 314 may be a field through which the user of the respective client computing device 112 can review the lifecycle state of the supplemental adverse event data object representation 308. In some embodiments, the supplemental adverse event data object representations 308 may be ordered or arranged based on the lifecycle state field 314 and the significance classification field 318, as will be described further herein. For instance, a supplemental adverse event data object representation 308 with a non-deprecated lifecycle state or status (e.g., "follow-up" or "Marked as follow-up") may be located above a supplemental adverse event data object representation 308 with a deprecated lifecycle state or status (e.g., "Marked as follow-up (Not Current"), "Superseded," "Deprecated," etc.), for the same case. For example, as shown in FIG. 3, case 37 is shown to have four pieces of supplemental adverse event data and four supplemental adverse event data object representations 308 in the supplemental adverse event data listing 304. Accordingly, the supplemental adverse event data object representation 308 with a non-deprecated lifecycle state ("Marked as follow-up") is arranged or listed above the three supplemental adverse event data object representations 308 with deprecated lifecycle states ("Marked as Follow-up (Not Current)").

The priority field 316 may be a field through which the user of the respective client computing device 112 can review and edit a priority of the supplemental adverse event data. The priority may be similar to the classification described herein, but further be used to determine a timeframe within which the case dataset is to be output to the partner computing system 108. For instance, a case dataset with a priority of P1 may be output in a shorter timeframe than a case dataset with a priority of P2.

The significance classification field 318 may be a field through which the user of the respective client computing device 112 can review the classification of the supplemental adverse event data of the supplemental adverse event data object representation 308. In some embodiments, the classification may determine the arrangement of the supplemental adverse event data object representations 308 on the supplemental adverse event data listing 304 of the supplemental adverse event data page 300. For instance, supplemental adverse event data object representations 308 may be grouped together based on common case datasets (e.g., all supplemental adverse event data for a case dataset are listed directly together with the non-deprecated supplemental adverse event data at the top), but each group of supplemental adverse event data object representations 308 may be arranged or ordered based on the classification of the supplemental adverse event data object representation 308 such that supplemental adverse event data classified into the third class ("Urgent-Significant Follow Up") may be displayed and arranged above supplemental adverse event data classified into the second class ("Significant Follow Up"), which may be displayed and arranged above supplemental adverse event data classified into the first class ("Non-Significant Follow Up").

For example, the supplemental adverse event data listing 304 may include twelve supplemental adverse event data object representations 308 including: a first group of four supplemental adverse event data object representations 308 associated with a first case dataset, a second group of four supplemental adverse event data object representations 308 associated with a second case dataset, and a third group of four supplemental adverse event data object representations 308 associated with a third case dataset. The up-to-date supplemental adverse event data of the first group may be classified into the third class. The up-to-date supplemental adverse event data of the second group may be classified into the second class. The up-to-date supplemental adverse event data of the third group may be classified into the first class. Accordingly, based on the classifications, the provider computing system 104 may arrange the first group of four supplemental adverse event data object representations 308 at the top of the supplemental adverse event data listing 304. Directly below the first group, the provider computing system 104 may arrange the second group of four supplemental adverse event data object representations 308. Directly below the second group, the provider computing system 104 may arrange the third group of supplemental adverse event data object representation 308.

The new info date field 320 may be a field through which the user of the respective client computing device 112 view the date on which the supplemental adverse event data of the supplemental adverse event data object representation 308 was received. Likewise, the study field 324 may be a selectable field through which the user of the respective client computing device 112 can review a study associated with the supplemental adverse event data of the supplemental adverse event data object representation 308. Similarly, the case field 326 may be a selectable field through which the user of the respective client computing device 112 can review the case dataset associated with the supplemental adverse event data of the supplemental adverse event data object representation 308. The study field 324 and the case field 326 are each selectable buttons that, when selected, navigate the user computing device 112 to a study page (not shown) and a case page 500, respectfully.

Referring now to FIG. 4, the inbox item or adverse event data page 400 which can be displayed on a display the I/O circuit 180 of the client computing device 112, is shown. In general, the adverse event data page 400 provides the user an interface to setup, modify, and manage a specific piece of adverse event data received by the provider computing system 104. As shown, the adverse event data page 400 includes a case validity and source section 404 To render or generate the adverse event data page 400 on the client computing device 112, the provider computing system 104 may provide a specific piece of adverse event data to the client computing device 112. In this regard, it should be understood that each of the sections, fields, or buttons of the adverse event data page 400 may be or included in the adverse event data described herein.

The case validity and source section 404 provides the user of the respective client computing device 112 with an interface to manage and review a specific piece of adverse event data or inbox item. As shown, the case validity and source section 404 includes an identifiable company product field 408, a study field (not shown), a company or medical product field 412, a product match confidence or ranking field 416, a product match criteria field 420, an adverse event field 424, a country field 428, an identifiable patient field 432, an identifiable reporter field 436, and a source file document field 440.

The company product or medical product field 412 may be a field through which the user of the respective client computing device 112 can review, edit, and/or initially set the medical product of the adverse event data of the adverse event data page 400. The product match confidence or ranking field 416 may be a field through which the user of the respective client computing device 112 can review a ranking of the likelihood the medical product is the correctly coded medical product. Further, the product match criteria field 420 may be a field through which the user of the respective client computing device 112 can review the verification preferences that were met to generate the ranking shown in the ranking field 416.

The adverse event field 424 may be a field through which the user of the respective client computing device 112 can review, edit, and/or initially set the adverse event term or code of the adverse event associated with the adverse event data page 400. Likewise, the identifiable patient field 432 may be a field indicating whether the adverse event data associated with the adverse event data page 400 has a patient that is identifiable (e.g., based on name, date of birth, address, etc.). Similarly, the identifiable reporter field 436 may be a field indicating whether the adverse event data associated with the adverse event data page 400 has a reporter that is identifiable (e.g., based on name, date of birth, address, etc.).

The identifiable company product field 408 may be a text field indicating whether the adverse event data or inbox item has an identifiable medical product (e.g., based on ID, substance name, medical product name or company name, etc.). Likewise, the country field 428 may be a text field through which the user of the client computing device 112 can review, edit, or initially set the country of the medical product. Similarly, the source file document field 440 may be a selectable button or link that, when selected, causes the client computing device 112 to navigate to a document viewer page (not shown) on which the received source file is displayed.

Referring now to FIG. 5, the case page 500 which can be displayed on a display the I/O circuit 180 of the client computing devices 112, is shown. In general, the case page 500 provides the user an interface to modify, manage, and process a specific case of the customer. As shown, the case page 500 includes a state section 504 and a case details section 516. To render or generate the case page 500 on the client computing device 112, the provider computing system 104 may provide the case dataset and the case data of the case dataset to the client computing device 112.

The case state section 504 may include and indicate the current state of the case dataset. For instance, the case state section 504 may include multiple phases or stage fields including a first phase or stage field, a second phase or stage field, a third phase or stage field, and a fourth phase or stage field. Each of the stage fields may be highlighted or colored, when the case dataset of the case page 500 has reached or passed that specific stage.

The case details section 516 may provide general fields or details of the case dataset to the client computing device 112 for review. For instance, the case details section 516 includes a case number field 518, a report type field 520, a receipt date field 522, a new info date field 524, a due date field 526, a primary adverse event field 528, a validation status field 530, an access group field 532, an intake format field 534, and an intake method field 536.

The case number field 518 may be a field through which the user of the respective client computing device 112 can review the case identifier or WWUID described herein. Likewise, the report type field 520 may be a field through which the user of the respective client computing device 112 can review the report type (e.g., spontaneous, study, etc.) of the case dataset.

The receipt date field 522 may be a field through which the user of the respective client computing device 112 can review the initial receipt date of the case dataset (e.g., the original source file). In comparison, the new info date field 524 may be a field through which the user of the respective client computing device 112 can review the receipt date of the up-to-date adverse event data associated with the case dataset.

The due date field 526 may be driven by the priority, as described herein, and be a field through which the user of the respective client computing device 112 can review the date on which the case dataset is required to be submitted or output. Likewise, the primary adverse event field 528 may be a field through which the user of the respective client computing device 112 can review and set the primary adverse event of the case dataset.

The validation status field 530, the access group field 532, the intake format 534, and the intake method field 536 may each be associated with the intake of the adverse event data associated with the case dataset.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for version control of a case dataset comprising:
    receiving, by a provider computing system, adverse event data;
    determining, by the provider computing system, first case data based at least partially on the adverse event data;
    generating, by the provider computing system, the case dataset including the case data and first version data, wherein the first version data is set to a first version;
    receiving, by the provider computing system, first supplemental adverse event data;
    classifying, by the provider computing system, the first supplemental adverse event data,
    wherein the first supplemental adverse event data is classified as at least one of: a first classification or a second classification;
    receiving, by the provider computing system, second supplemental adverse event data;
    classifying, by the provider computing system, the second supplemental adverse event data,
    wherein the second supplemental adverse event data is classified as at least one of: the first classification or the second classification;
    determining, by the provider computing system, supplemental case data based at least partially on the second supplemental adverse event data;
    generating, by the provider computing system, second version data based on the first version data, wherein the second version data is set to a second version;
    generating, by the provider computing system, a supplemental case dataset including the supplemental case data and the second version data; and
    outputting, by the provider computing system, the supplemental case dataset.

2. The method of claim 1, wherein the first supplemental adverse event data is received on a first receipt date, wherein the second adverse event data is received on a second receipt date, and wherein the second receipt date is after the first receipt date.

3. The method of claim 2, further comprising:
    determining, by the provider computing system, a supplemental case dataset receipt date based on the first receipt date or the second receipt date;
    determining, by the provider computing system, a period of time based on the supplemental case data of the supplemental case dataset; and
    determining, by the provider computing system, a final submission date by adding the period of time to the supplemental case dataset receipt date,
    wherein the supplemental case dataset is output before the final submission date.

4. The method of claim 3, wherein, in response to the first supplemental adverse event data being classified as the first classification and the second supplemental adverse event data being classified as the second classification, the supplemental case dataset receipt date is the second receipt date.

5. The method of claim 3, wherein, in response to the first supplemental adverse event data being classified as the second classification and the second supplemental adverse event data being classified as the first classification, the supplemental case dataset receipt date is the first receipt date.

6. The method of claim 1, further comprising:
    determining, by the provider computing system, a plurality of differences between the first supplemental adverse event data and the case data of the case dataset,
    wherein the first supplemental adverse event data is classified as the second classification based on the plurality of differences between the first supplemental adverse event data and the case data of the case dataset;
    determining, by the provider computing system, a single difference between the first supplemental adverse event data and the case data of the case dataset,
    wherein the second supplemental adverse event data is classified as the second classification based on the single difference between the second supplemental adverse event data and the case data of the case dataset.

7. The method of claim 1, wherein the first version is an initial version, and wherein the second version is not an initial version.

8. The method of claim 1, further comprising:
    generating, by the provider computing system, a first adverse event data object including a lifecycle state;
    adding, by the provider computing system, the first supplemental adverse event data to the first adverse event data object; and
    modifying, by the provider computing system, the lifecycle state from a first state to a deprecated state to indicate the first supplemental adverse event data is deprecated.

9. The method of claim 1, wherein the case data includes a case identifier, and wherein receiving the first supplemental adverse event data comprises:
    receiving, by the provider computing system, second adverse event data; and
    determining, by the provider computing system and in response to the second adverse event data including the case identifier, the second adverse event data is the first supplemental adverse data.

10. The method of claim 1, wherein the supplemental case dataset is output as an E2B XML file.

11. The method of claim 1, wherein the adverse event data includes a Medical Dictionary for Regulatory Activities (MedDRA) code, a date, and a medical product identifier.

12. A method for version control of a case dataset comprising:
    receiving, by a provider computing system, first adverse event data;
    determining, by the provider computing system, first case data based at least partially on the adverse event data, wherein the first case data includes a case identifier;
    generating, by the provider computing system, the case dataset including the case data and first version data, wherein the first version data is set to a first version;
    receiving, by the provider computing system, second adverse event data;
    determining, by the provider computing system and in response to the second adverse event data including the case identifier, the second adverse event data is first supplemental adverse data;

receiving, by the provider computing system, third adverse event data;

determining, by the provider computing system and in response to the third adverse event data including the case identifier, the third adverse event data is second supplemental adverse data;

modifying, by the provider computing system, the first supplemental adverse event data to deprecate the first supplemental adverse event data;

determining, by the provider computing system, supplemental case data based at least partially on the second supplemental adverse event data;

generating, by the provider computing system, second version data based on the first version data, wherein the second version data is set to a second version;

generating, by the provider computing system, a supplemental case dataset including the supplemental case data and the second version data; and outputting, by the provider computing system, the supplemental case dataset.

13. The method of claim 12, wherein the second adverse event data is received on a first receipt date, wherein the third adverse event data is received on a second receipt date, and wherein the second receipt date is after the first receipt date.

14. The method of claim 13, further comprising:

determining, by the provider computing system, a supplemental case dataset receipt date based on the first receipt date or the second receipt date;

determining, by the provider computing system, a period of time based on the supplemental case data of the supplemental case dataset; and determining, by the provider computing system, a final submission date by adding the period of time to the supplemental case dataset receipt date, wherein the supplemental case dataset is output before the final submission date.

15. The method of claim 14, further comprising:

classifying, by the provider computing system, the first supplemental adverse event data as a first classification; and classifying, by the provider computing system, the second supplemental adverse event data as a second classification, and wherein, in response to the first supplemental adverse event data being classified as the first classification and the second supplemental adverse event data being classified as the second classification, the supplemental case dataset receipt date is the second receipt date.

16. The method of claim 14, further comprising:

classifying, by the provider computing system, the first supplemental adverse event data as a second classification; and classifying, by the provider computing system, the second supplemental adverse event data as a first classification, and wherein, in response to the first supplemental adverse event data being classified as the second classification and the second supplemental adverse event data being classified as the first classification, the supplemental case dataset receipt date is the first receipt date.

17. The method of claim 12, wherein the second adverse event data is received on a first receipt date, wherein the third adverse event data is received on a second receipt date, wherein the second receipt date is after the first receipt date, and wherein the method further comprises:

receiving, by the provider computing system, a partner computing system preference associated with a first partner computing system, wherein the first adverse event data, the second adverse event data, and the third adverse event data are each received from the first partner computing system, and wherein the provider computing system modifies the first supplemental adverse event data to deprecate the first supplemental adverse event data based on the partner computing system preference, the first receipt date, and the second receipt date.

18. The method of claim 17, further comprising:

receiving, by the provider computing system, fourth adverse event data from the first partner computing system, wherein the fourth adverse event data is received on a third receipt date before the second receipt date;

determining, by the provider computing system and in response to the fourth adverse event data including the case identifier, the fourth adverse event data is third supplemental adverse data; and modifying, by the provider computing system, the third supplemental adverse event data to deprecate the third supplemental adverse event data based on the partner computing system preference, the second receipt date, and the third receipt date.

19. The method of claim 12, wherein the first version is an initial version, and wherein the second version is not an initial version.

20. The method of claim 12, further comprising:

generating, by the provider computing system, a first adverse event data object including a lifecycle state; and adding, by the provider computing system, the first supplemental adverse event data to the first adverse event data object.

21. The method of claim 20, wherein modifying the first supplemental adverse event data to deprecate the first supplemental adverse event data comprises:

modifying, by the provider computing system, the lifecycle state from a first state to a deprecated state to indicate the first supplemental adverse event data is deprecated.

22. The method of claim 12, wherein the adverse event data includes a Medical Dictionary for Regulatory Activities (MedDRA) code, a date, and a medical product identifier.

* * * * *